(12) United States Patent
Sun et al.

(10) Patent No.: US 12,111,810 B2
(45) Date of Patent: Oct. 8, 2024

(54) DATABASE QUERY MANAGEMENT USING A NEW COLUMN TYPE

(71) Applicant: INTERNATIONAL BUSINESS MACHINES CORPORATION, Armonk, NY (US)

(72) Inventors: Sheng Yan Sun, Beijing (CN); Hong Mei Zhang, Haidian District (CN); Peng Hui Jiang, Beijing (CN); Meng Wan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 17/708,202

(22) Filed: Mar. 30, 2022

(65) Prior Publication Data
US 2023/0315710 A1    Oct. 5, 2023

(51) Int. Cl.
G06F 16/22    (2019.01)
G06F 11/34    (2006.01)
G06F 16/21    (2019.01)
G06F 16/2453  (2019.01)

(52) U.S. Cl.
CPC ...... *G06F 16/2282* (2019.01); *G06F 11/3419* (2013.01); *G06F 16/213* (2019.01); *G06F 16/24534* (2019.01)

(58) Field of Classification Search
CPC .............. G06F 16/2282; G06F 16/24534
USPC ........................................... 707/803
See application file for complete search history.

(56) References Cited

U.S. PATENT DOCUMENTS

| | | | |
|---|---|---|---|
| 9,898,488 B2 | 2/2018 | Schrum | |
| 2002/0143754 A1* | 10/2002 | Paulley | G06F 16/24534 |
| 2008/0301085 A1* | 12/2008 | Faunce | G06F 16/24544 |
| 2013/0013767 A1* | 1/2013 | Stober | G06F 9/44505 |
| | | | 709/224 |
| 2015/0066994 A1 | 3/2015 | Li et al. | |
| 2016/0154829 A1 | 6/2016 | Schrum | |
| 2019/0332698 A1 | 10/2019 | Cho et al. | |
| 2020/0005033 A1* | 1/2020 | Bellert | G06F 16/93 |
| 2020/0356594 A1 | 11/2020 | Liu et al. | |
| 2020/0409925 A1* | 12/2020 | Li | G06F 16/2474 |
| 2022/0107922 A1* | 4/2022 | Krishnamoorthy | |
| | | | G06F 16/2282 |

OTHER PUBLICATIONS

Mell et al., "The NIST Definition of Cloud Computing", NIST, Special Publication 800-145, Sep. 2011, 7 pages.

* cited by examiner

*Primary Examiner* — Muluemebet Gurmu
(74) *Attorney, Agent, or Firm* — Nicholas Welling; Andrew D. Wright; Calderon Safran & Wright P.C.

(57) ABSTRACT

A computer-implemented method includes: collecting, by a computing device, database activities and database structure information of a database; identifying, by the computing device, related columns in the database; determining, by the computing device, one or more data types for column transference of the identified related columns; generating, by the computing device, a super union column based on the column transference and the identified related columns; and updating, by the computing device, the database with the super union column.

20 Claims, 8 Drawing Sheets

DATABASE QUERY MANAGEMENT USING A NEW COLUMN TYPE

BACKGROUND

Aspects of the present invention relate generally to database information management and, more particularly, to database query management using a new column type. Efficient database information management is important to database systems since queries for data from managed databases may be received at extremely high volumes.

SUMMARY

In a first aspect of the invention, there is a computer-implemented method including: collecting, by a computing device, database activities and database structure information of a database; identifying, by the computing device, related columns in the database; determining, by the computing device, one or more data types for column transference of the identified related columns; generating, by the computing device, a super union column based on the column transference and the identified related columns; and updating, by the computing device, the database with the super union column.

In another aspect of the invention, there is a computer program product including one or more computer readable storage media having program instructions collectively stored on the one or more computer readable storage media. The program instructions are executable to: collect database activities and database structure information of a database; identify related columns in the database; determine one or more data types for column transference of the identified related columns; generate a super union column based on the column transference and the identified related columns; and append the super union column to the database.

In another aspect of the invention, there is system including a processor, a computer readable memory, one or more computer readable storage media, and program instructions collectively stored on the one or more computer readable storage media. The program instructions are executable to: receive a query from an application for data in a database with a super union column; determine the query is covered by data in the super union column; and send a result set using the data in the super union column based on the determination that the query is covered by the data in the super union column to the application.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to database management and, more particularly, to generating a super union column to reduce computational storage space used. In embodiments, a computing device facilitates database management. In this manner, implementations of the invention provide super union column generation for database management in queries of commonly accessed values in columns of a database. In embodiments, the super union column provides a relationship to the data in the database without clearly defining the data in the super union column.

In aspects of the invention, there is a method to analyze and identify columns that have internal corresponding relationship(s), and generate a new column structure with suitable data types for effective application usage. In embodiments, the method analyzes and concludes application usage experience with an appended table with the new column to split the column for real business use. The new column is dynamic and self-creative, and can replace some existing database object creations in the database with transparency to the applications. In embodiments, the method automatically discovers relationships in the database to create the new column.

In information management systems such as relational and non-relational database systems, many methods of database management involve updates to database values, added columns to a database, and columns where very few values exist. These database management methods result in databases that are full of empty values (i.e., databases that include many "holes"). These holes may greatly reduce the performance of the information management system. Further, many fixed composite queries from remote applications have combinations and conversions of field types displayed for different needs. This results in the ability to use a view or a materialized view to support the fixed comprehensive queries, but does this with reduced performance by the system or inability to support application upgrade requirements.

Implementations of the invention provide an improvement in the technical field of information management by providing a technical solution to the problem of performance loss when querying a database. In embodiments, the technical solution involves: collecting database activities and database structure information of a database; identifying related columns in the database; determining one or more data types for column transference of the identified related columns; generating a super union column based on the column transference and the identified related columns; and updating the database with the super union column. These steps allow the database management system to better manage queries of commonly accessed values. The super union columns reduce computing performance costs in searching columns with many missing values and/or by calling to values that have less complexity. Further, these steps provide users with a self-creative database management process that precludes user involvement in determining internal relationships of data in the database. These steps also limit exposure of explicit relationships in a data package by obscuring these relationships with the generated super union column.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
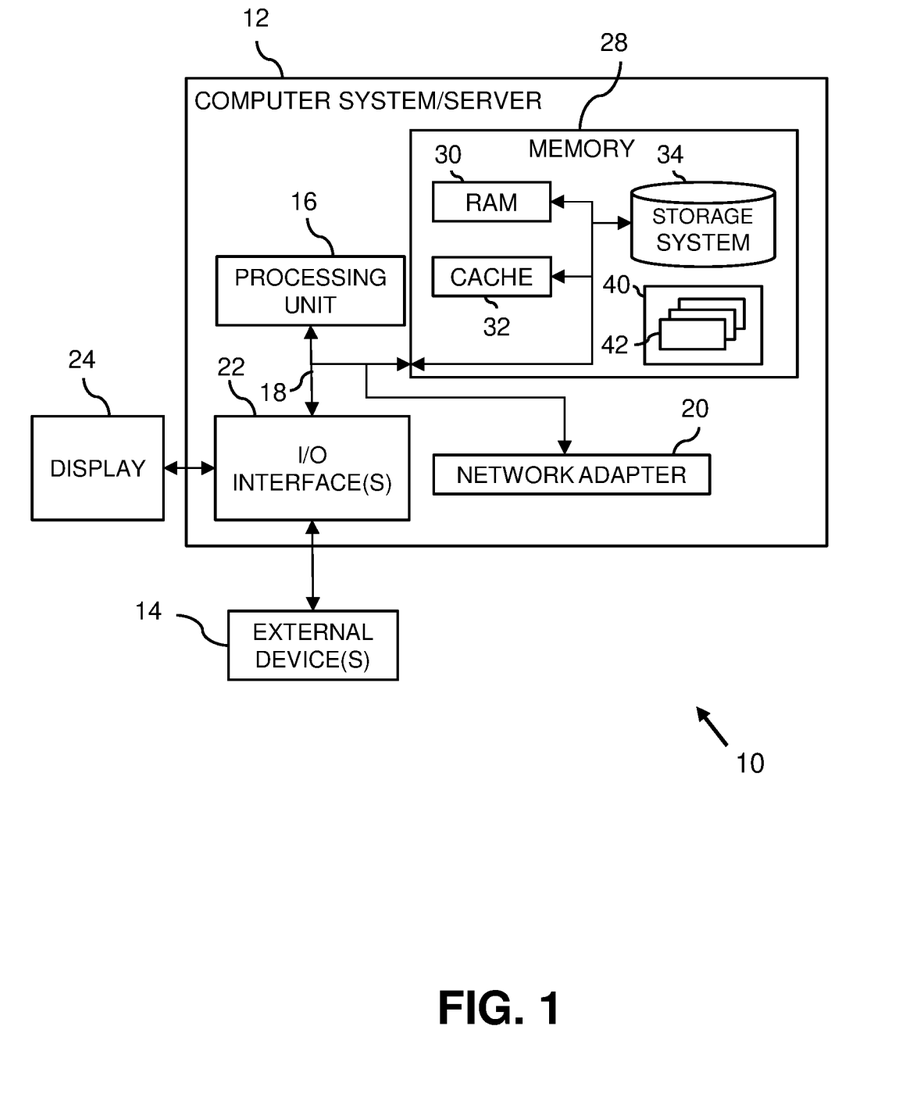
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
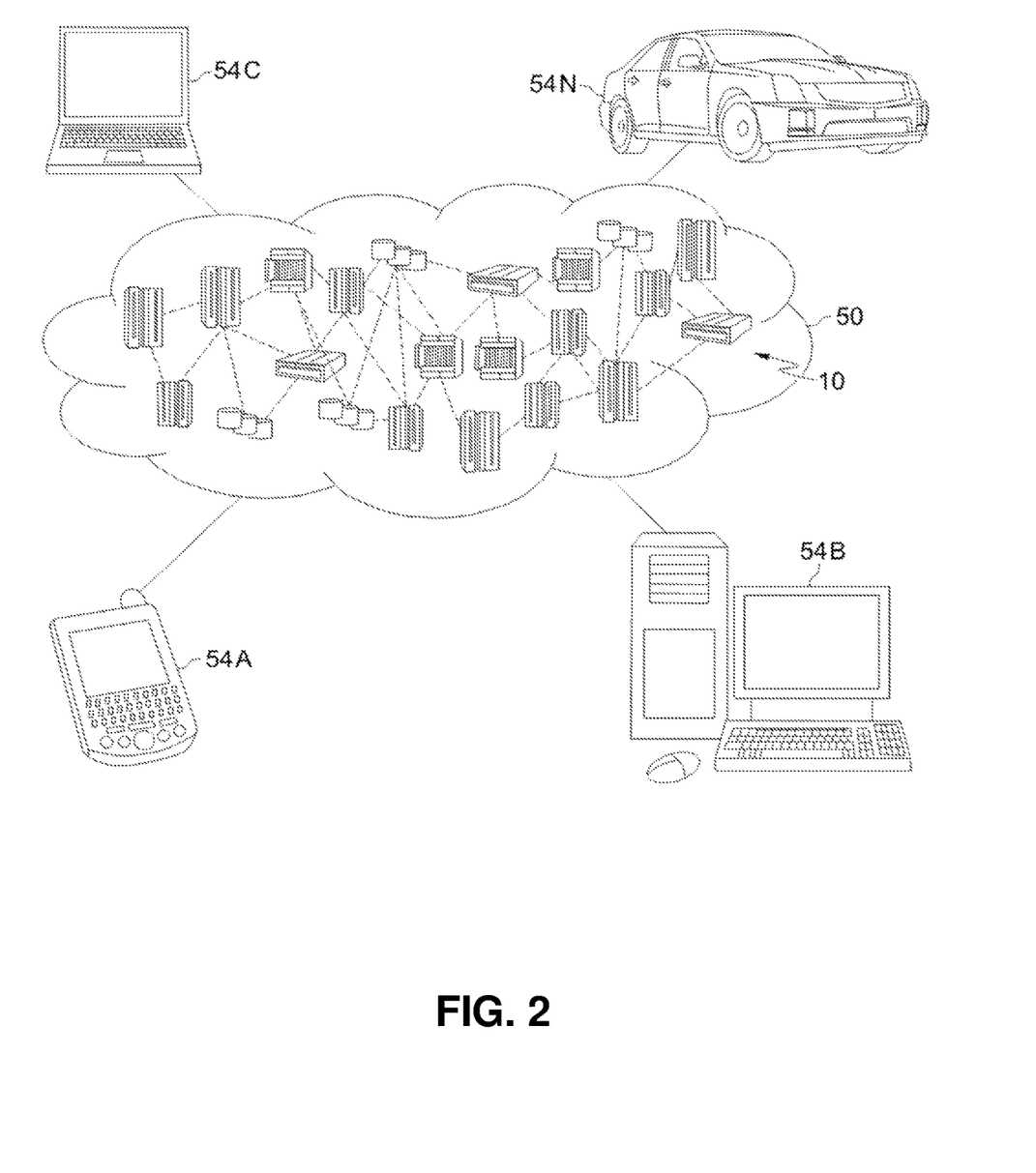
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
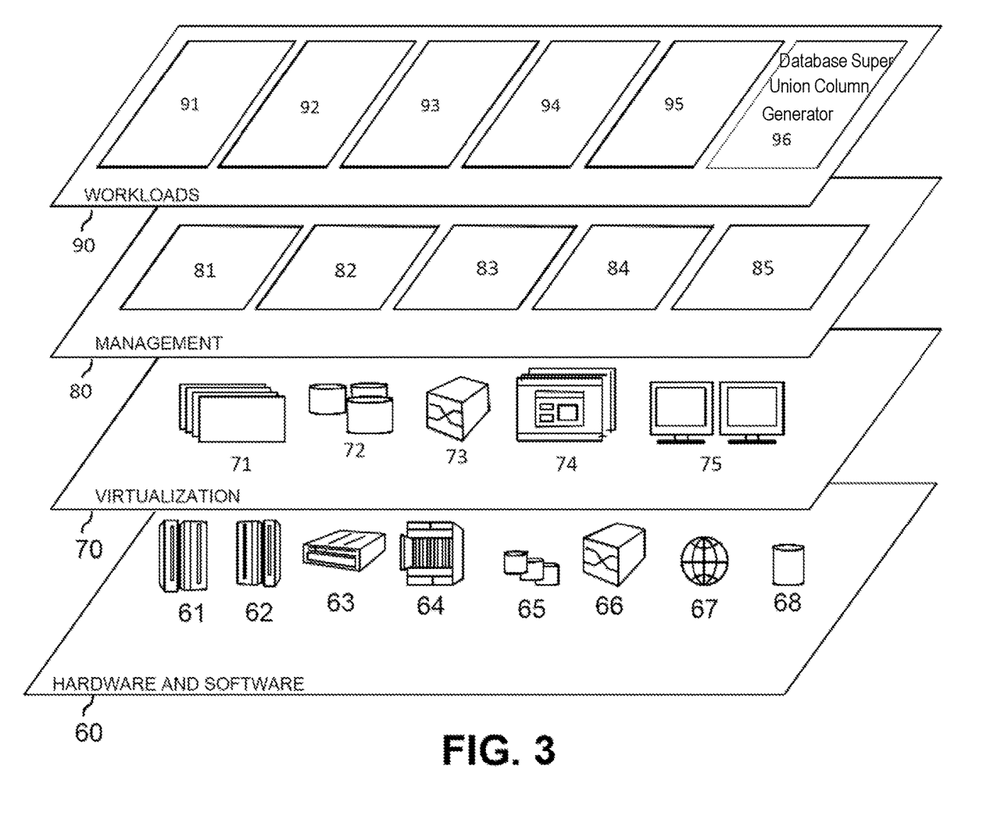
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database super union column generator 96.

Implementations of the invention may include a computer system/server 12 of FIG. 1 in which one or more of the program modules 42 are configured to perform (or cause the computer system/server 12 to perform) one or more functions of the database super union column generator 96 of FIG. 3. For example, the one or more of the program modules 42 may be configured to: collect, by a computing device, database activities and database structure information of a database; identify, by the computing device, related columns in the database; determine, by the computing device, one or more data types for column transference of the identified related columns; generate, by the computing device, a super union column based on the column transference and the identified related columns; and update, by the computing device, the database with the super union column.

Figure 4:
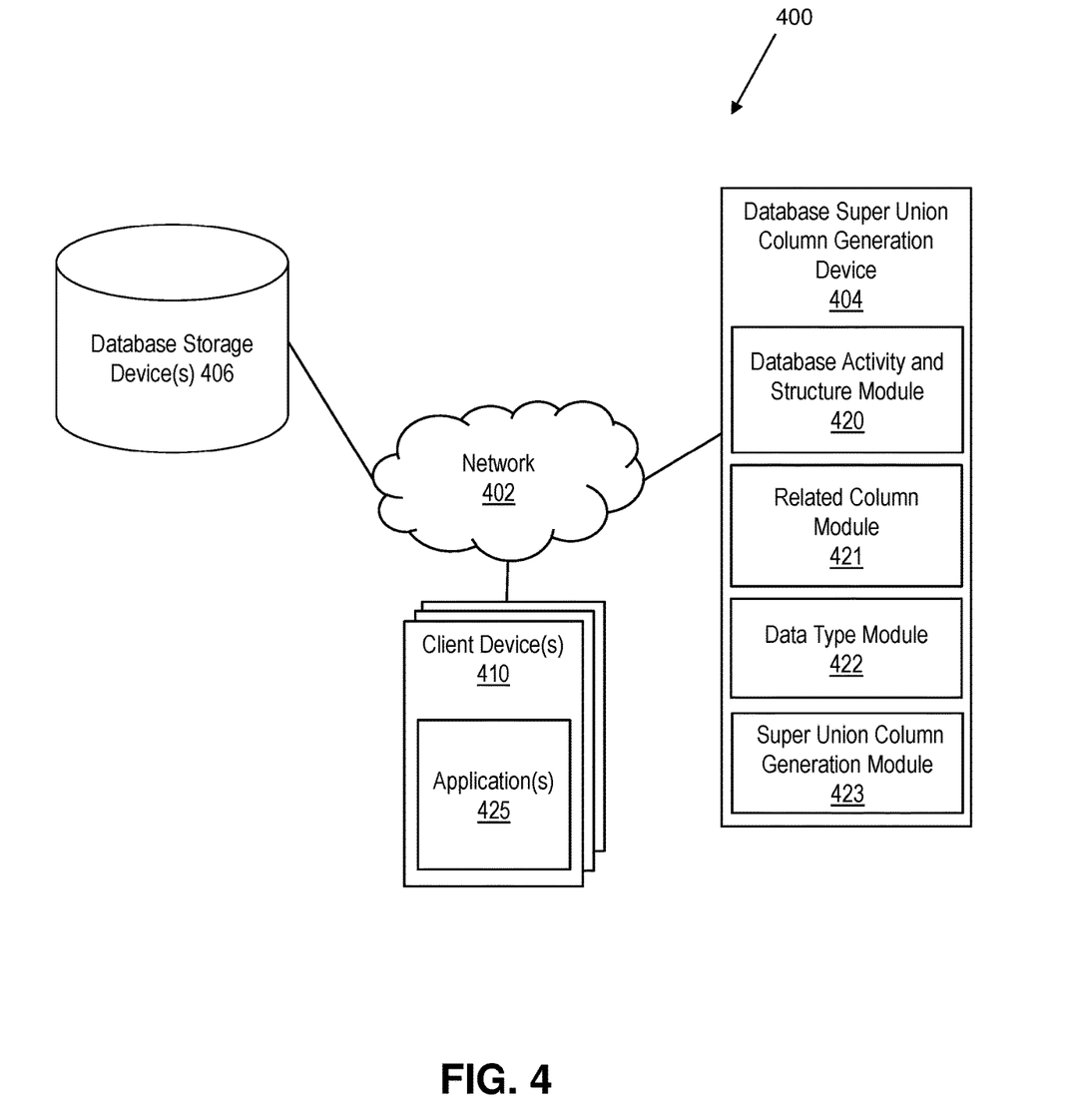
FIG. 4 shows a block diagram of an exemplary environment in accordance with aspects of the invention.

FIG. 4 shows a block diagram of an exemplary database super union column generation environment in accordance with aspects of the invention. In embodiments, the database super union column generation environment includes a network 402 enabling communication between database super union column generation device 404, database storage device(s) 406, and client device(s) 410.

The database storage device(s) 406 may comprise computing devices (e.g., the computer system/server 12 of FIG. 1, or elements thereof) in a networked environment. In implementations, the database storage device(s) 406 may comprise one or more nodes 10 in the cloud computing environment 50 of FIG. 2. In accordance with aspects of the invention described below, the database storage device(s) 406 may manage and store databases for access by users and/or application(s) 425 of client device(s) 410. The database storage device(s) 406 may store a database of information managed by information management systems including relational databases (e.g., structured query language (SQL), etc.). However, it is understood that the invention should also work with non-relational databases management systems such as "not only SQL" (NoSQL) databases.

The client device(s) 410 may comprise computing devices (e.g., the computer system/server 12 of FIG. 1, or elements thereof) in a networked environment. In implementations, the client device(s) 410 comprise personal computing devices (e.g., 54A, 54B, 54C, etc.) in the cloud computing environment 50 of FIG. 2. The client device(s) 410 may comprise one or more program modules such as program modules 42 described with respect to FIG. 1. In embodiments, the client device(s) 410 include application(s) 425 that may request data from a database management system which thereby collects the data from the database storage device(s) 406.

In embodiments, an information management system comprises the database super union column generation device 404 to manage access to data in databases stored on the database storage device(s) 406. In implementations, the database super union column generation device 404 comprises one or more server computing devices each including one or more elements of the computer system/server 12 of FIG. 1. In one example, the database super union column generation device 404 comprises one or more virtual machines (VMs) or one or more containers running on one or more server computing devices. In embodiments, the database super union column generation device 404 is configured to generate a super union column to provide access to identified related data without providing an explicit relationship between the related data. In embodiments, the database super union column generation device 404 updates a database by appending a new column type associated with requests (historical and current) and identified data. The new column type provides faster access to the commonly requested data. The new column type also has reduced storage requirements through column transference of the commonly requested data.

In embodiments, the database super union column generation device 404 comprises a database activity and structure module 420, related column module 421, data type module 422, and super union column generation module 423, each of which may comprise one or more program modules such as program modules 42 described with respect to FIG. 1. The database super union column generation device 404 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the database activity and structure module 420 is configured to collect database activity and database structure for analysis. In one example, the database activity is collected from a database log. The database log may be collected from the database storage device(s) 406 themselves or from a third-party database storage management device of the database storage device(s) 406. In embodiments, the database structure may be analyzed from the database storage device(s) 406.

In embodiments, the related column module 421 utilizes information from the database activity and structure module 420 to identify related columns in the database. In an exemplary embodiment, the related column module 421 groups a superset of a select list of columns from the database that are commonly used together (as identified from the database structure and the activities). For example, a superset of an identical select list of columns that are commonly called (i.e., identical in a plurality of queries) may include a user's name: first, middle, and surname. These three name related columns would generally be selected together as a user identity. In an exemplary embodiment, the related column module 421 also extracts a common subset of the select list of columns based on business rules. In other words, the commonly used columns may include business-related and non-business-related columns that are used together. For example, for a business doing online sales, business rules may include counting the number of a product in a warehouse and reducing the amount by one after a user has ordered the product. The business-related columns may then include a product identifier (ID), a count of the product, the user, the user's address, an order number, and a number of products ordered. Non-business-related columns may include other identifiable information about the user including age, etc.

In embodiments, the related column module 421 utilizes queries by applications, whether in the database activities or as new queries, to identify common columns in the select list of columns. For example, a previously identified common column may include the product ID and number of products in the warehouse. When a user requests (i.e., queries) to see a product in a store application, the product ID and number of products in the warehouse are displayed. In embodiments, the query includes functions that return information. For example, a function may count the number of products in the warehouse that only have a quantity of one and return each related product ID.

In embodiments, the related column module 421 normalizes a query with structure. In one example, the related column module 421 normalizes the query by removal or replacement of predicate values in a query. In embodiments, the related column module 421 replaces the predicate value (e.g., a conditioned expression) with a question mark for the value in the query acting as a flagged query structure. For example, a predicate value in determining a select set of products having one quantity may return a true-false Boolean result and be removed or replaced with a question mark to flag and remove the predicate value from the query. The removal or replacement obfuscates the predicate value, prevents the query from requesting the value directly from the original database, and normalizes the query to request the same information from the super union column.

In embodiments, the related column module 421 normalizes the query by removal or replacement of functions in where-conditions and subqueries to use common function calls. In one example, the related column module 421 replaces the functions with a question mark for the value in the query acting as a flagged query structure. When a function uses uncommonly used function calls, a closest function that acts in a similar manner is determined to replace the function in the query. For example, a query may include a user created function such as a formatted date function that gets a date value from the table with a particular day+month+year format. The function is then replaced with a simple date function to call up the same date without formatting. The removal or replacement obfuscates the function, prevents the query from requesting the value directly from the original database, and normalizes the query to request the same information from the super union column.

In embodiments, the related column module 421 normalizes the query by removal or replacement of case-when structure (i.e., if-then-else) in a query. In one example, the related column module 421 replaces the functions in where clauses with a question mark for the value in the query acting as a flagged query structure. For example, a predicate value in determining a select set of products having one quantity may return a true-false Boolean result and be removed or replaced with a question mark to flag and remove the predicate value from the query. The removal or replacement obfuscates the case-when structure, prevents the query from requesting the value directly from the original database, and normalizes the query to request the same information from the super union column.

In embodiments, the data type module 422 utilizes the identified related columns from the related column module 421 to determine whether each identified column data type may be transferred to a simpler data type that reduces the bits used by the data in the column (i.e., reduce complexity). In embodiments, the data type module 422 will not transfer to data types that will require more complex data types (i.e., take more bits in the storage memory for the super union column). This may involve, for example, moving from an integer data type to a string data type. In an exemplary embodiment, the data type module 422 chooses a suitable data type for each value of a super union column based on the original data type of the identified related columns. For example, a user class registration type column may be in the database as 'audit' and 'graded' which has a data type of characters of varying length. In this example, the data type module 422 may determine that the values for the data type of the user class registration type column only include an empty value, 'audit' or 'graded' and thus can be transferred to a simpler small integer data type of '0,' '1,' and '2' that only takes 16 bits of stored memory. In this example, the column transference is included in the super union column for later faster call back. Table 1 below shows a column data type transfer. For example, the "Double" data type may transfer to the "Float" data type to reduce complexity and space taken. The "Char" (i.e., character) data type may transfer to "Int" (i.e., integer) data type for similar reasons.

TABLE 1

| Transfer Data Type Example | | | | |
| --- | --- | --- | --- | --- |
| Row | Value1 | Value2 | Value3 | Value4 |
| 1 | Float | Double | Char | Int |

In an exemplary embodiment, the column transference is used in upgrading applications or business application related changes. For example, in instances where large amounts of data need to be migrated, the column transference helps to reduce the space taken by these migrations. For example, when a list of customers includes millions of people and the database management system would like to update the order taking system, data types for user information with two selections, such as a column defining whether the customer is a consumer or business customer, may be transferred into a binary data type with 0 replacing a consumer customer and 1 replacing a business customer. In this example, use of the binary data type reduces the space taken by the column transference.

In embodiments, the super union column generation module 423 updates the database catalog with a generated super union column. In an exemplary embodiment, the super union column includes transferred columns from the data type module 422. In an exemplary embodiment, the super union column generation module 423 identifies a return value from the related column module 421 based on both the normalized query and column relationship identifications. The flagged (i.e., question marked) or removed query structure and normalized function may provide rules which return values may utilize. For example, Tables 2A and 2B below show an example of a database used to generate a super union column (i.e., transforms the table THTF_STUDENTS of Table 2A to the super union column of Table 2B) based on a query for passing students of a certain class registration type. Table 2B is generated with a query build rule that adds a case-when structure that is based on the normalized query. Table 2B includes the number of class registration type students in a class and each audited and graded student that would have passed the class may be appended to the database for later call back. Table 2B updates the database in Table 2A by appending the values of Table 2B to Table 2A. Thus, the updated database includes both the values from Table 2A, as well as the values in Table 2B. The updated database is then able to provide applications with faster results for requests involving the values in Table 2B.

TABLE 2A

Super Union Column Example Table (i.e., THTF_STUDENTS)

```
SELECT
  STUDENT_NAME,
  (CASE WHEN score < 60 THEN ' Don' t pass '
    WHEN score >= 60 AND score < 80 THEN 'pass'
    WHEN score >= 80 THEN ' good '
    ELSE 'abnormal' END) AS REMARK
FROM
  TABLE THTF_STUDENTS
```

| STU_CODE | STU_NAME | STU_CLASSTYPE | STU_SCORE |
|---|---|---|---|
| XM | XIAOMING | 0 | 80 |
| XL | XIAOLEI | 0 | 50 |
| XF | XIAOFENG | 0 | 40 |
| XH | XIAOHONG | 1 | 60 |
| XN | XIAONI | 1 | 70 |
| XY | XIAOYIN | 1 | 90 |

TABLE 2B

Super Union Column Example Result

```
SELECT
  SUM (CASE WHEN STU_CLASSTYPE = 0 THEN 1 ELSE 0 END) AS AUDIT_COUNT,
  SUM (CASE WHEN STU_CLASSTYPE = 1 THEN 1 ELSE 0 END) AS GRADED_COUNT,
  SUM (CASE WHEN STU_SCORE >= 60 AND STU_CLASSTYPE = 0 THEN 1 ELSE 0 END) AS
AUDIT_PASS,
  SUM (CASE WHEN STU_SCORE >= 60 AND STU_CLASSTYPE = 1 THEN 1 ELSE 0 END) AS
GRADED_PASS
FROM
  THTF_STUDENTS
```

| AUDIT_COUNT | GRADED_COUNT | AUDIT_PASS | GRADED_PASS |
|---|---|---|---|
| 3 | 3 | 1 | 3 |

Figure 5:
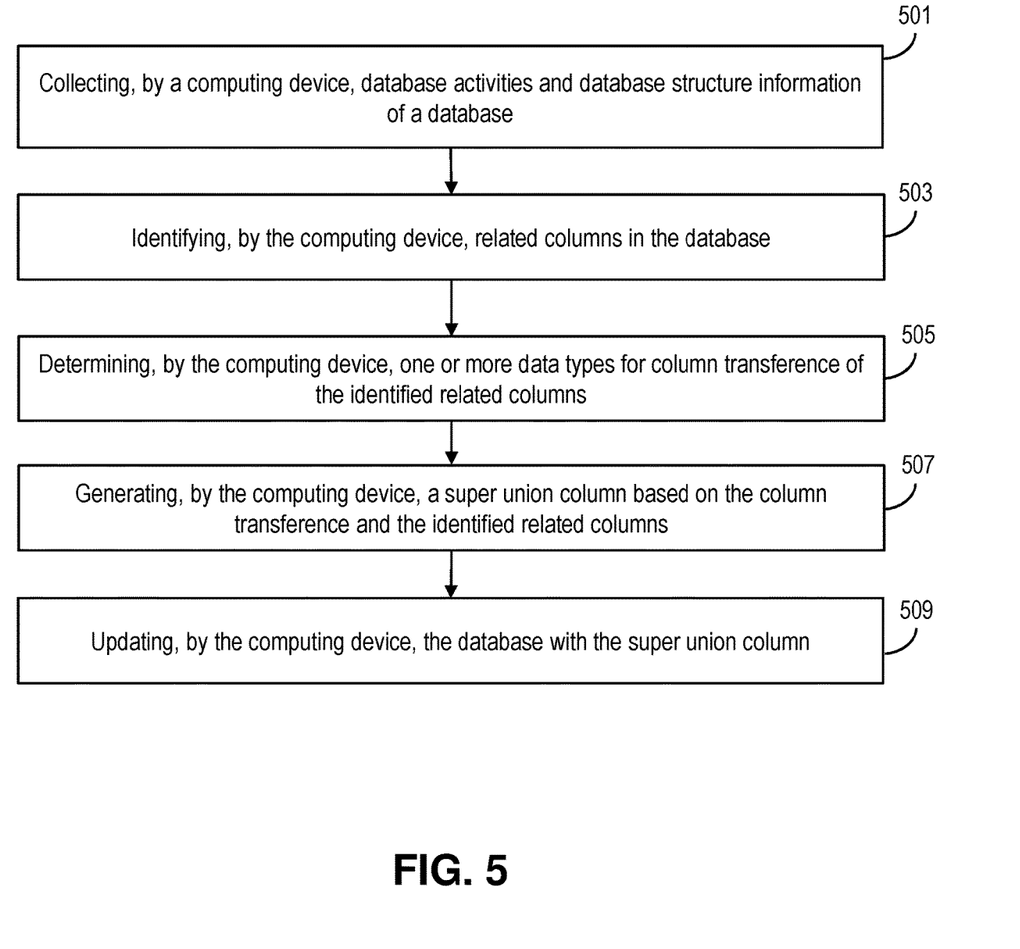
FIG. 5 shows a flowchart of an exemplary method of generating a super union column in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the database super union column generation device 404 of FIG. 4 collects database activities and database structure information of a database from the database storage device(s) 406. In an exemplary embodiment, the database super union column generation device 404 may receive many fixed composite queries from remote applications that have combinations and conversions of field types displayed for different needs. For example, some queries may request a user's name with surname name first and first name second, and other queries may request a user's name with first name first and surname second. Additionally, in an exemplary embodiment, the database activities may include queries that include a conditioned expression that returns a Boolean type. When the Boolean type is true, a function of the query returns a corresponding result value; when the Boolean type is false, a result value of NULL or based on an ELSE clause is returned. For example, if a query is requesting all the middle names of users, and not all users have middle names, the result value returned for users without a middle name will be NULL unless an ELSE clause asks to return an 'n/a' remark.

At step 503, the database super union column generation device 404 of FIG. 4 identifies related columns in the database. For example, these related columns may include commonly called columns such as first and last name columns or user's name with a user identifier (ID). At step 505, the database super union column generation device 404 of FIG. 4 determines one or more data types for column transference of the identified related columns. At step 507, the database super union column generation device 404 of FIG. 4 generates a super union column based on the column transference and the identified related columns. In an exemplary embodiment, the super union column includes both the column transference values, as well as related columns associated with queries. The historical activity of the database is tracked for commonly called values/columns from the database and thus these commonly called values/columns may be set aside in the super union column with a simplified data type and/or commonly requested query functions. For example, shoppers from particular geographic locations may be counted to determine locations where advertising dollars should go. At step 509, the database super union column generation device 404 of FIG. 4 updates the database with the super union column. In an exemplary embodiment, the super union column is appended to the database for later expedited call back by other queries. In an exemplary embodiment, the updated database is stored in the database storage device 406. In an exemplary embodiment, the updated database is stored in a different database storage device 406 based on a lack of space in the original database storage device 406 or for obfuscation or privacy purposes.

Figure 6:
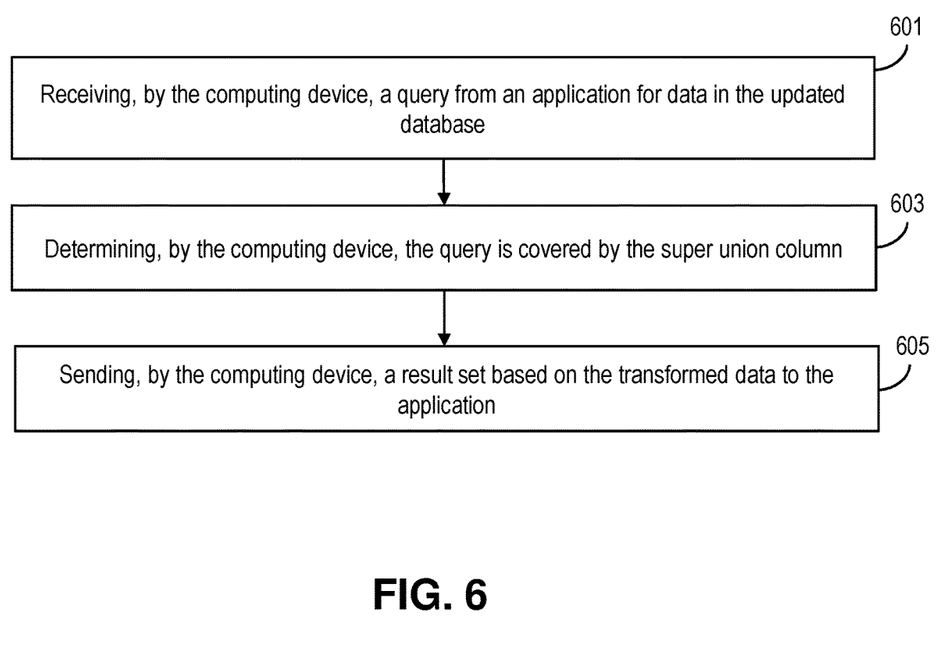
FIG. 6 shows a flowchart of an exemplary method of using a super union column in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4. In some implementations, the method of FIG. 6 occurs after the super union column is generated as shown in FIG. 5.

At step 601, the database super union column generation device 404 of FIG. 4 receives a query from an application for data in an updated database with a super union column. At step 603, the database super union column generation device 404 of FIG. 4 determines the query is covered by data in the super union column. In an exemplary embodiment, used super union columns are tracked and maintained by the database super union column generation device 404. In an exemplary embodiment, the database super union column generation device 404 requests super union column information and determines based on the query build rules associated with the super union column whether the query is covered by the super union column. In an exemplary embodiment, the query requests the same data from the super union column or requests identified related columns that were used to generate the super union column.

At step 605, the database super union column generation device 404 of FIG. 4 sends a result set using the data in the super union column based on the determination that the query is covered by the data in the super union column to the application. In an exemplary embodiment, the result set includes results of the query as well as the query build rule created based on the query. In an exemplary embodiment, the query build rule is placed in a quick store table (QST) for access by the database super union column generation device 404. In an exemplary embodiment, the removed or flagged predicate values, functions, or case-when structures may be used to determine the query build rule and thereby the result set. The result set includes values that are stored in the super union column. For example, if a user's middle name exists, then a case-when structure in a query may request a user's first name, middle name, and last name. However, if the middle name does not exist (i.e., the ELSE clause), then only the first name and last name are requested. In this example, a result set (in the super union column) would include names with values including at least first and last names except when users have a middle name, in which case, all three names would be placed in the super union column. Further, the super union column may reduce processing costs for columns in the database with many missing values. For example, when many users do not have middle names, only the users with middle names will be provided in the result set with all three names (e.g., first, middle, and last) without wasting processing power on determining null values in the middle name column.

Figure 7:
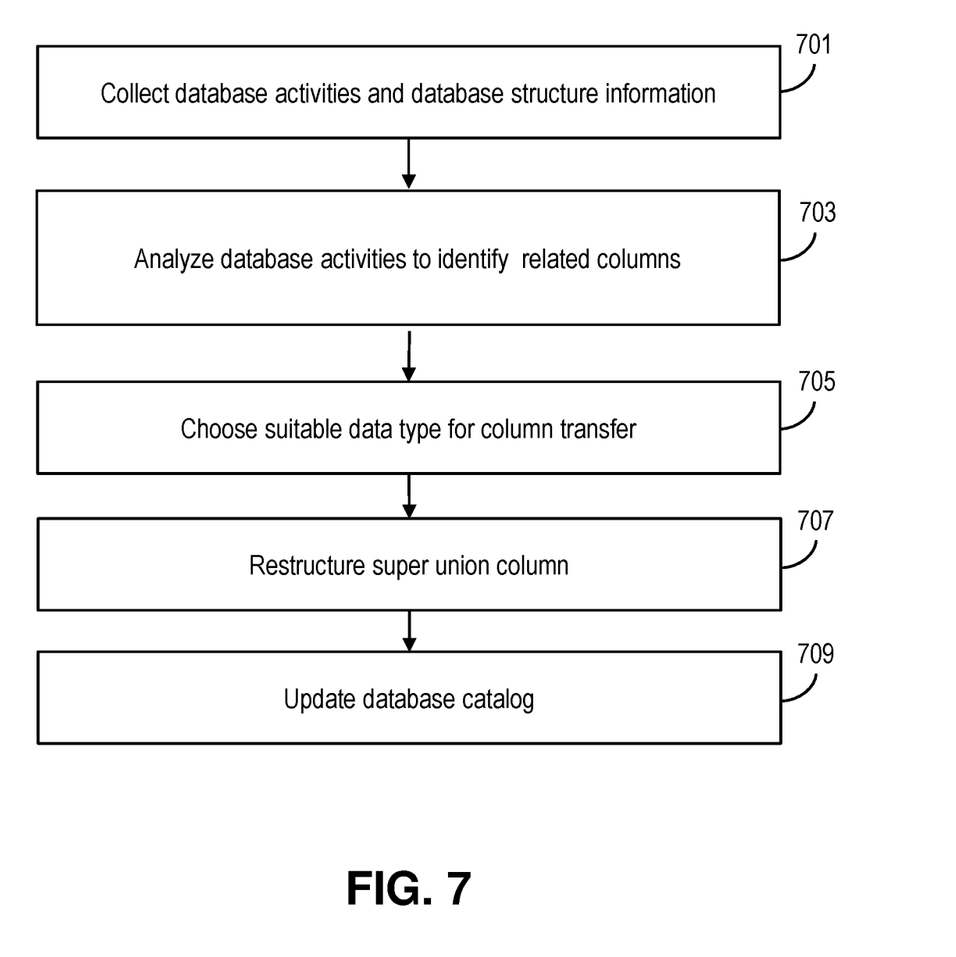
FIG. 7 shows a flowchart of another exemplary method of generating a super union column in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4.

At step 701, the database super union column generation device 404 of FIG. 4 collects database activities and database structure information. At step 703, the database super union column generation device 404 of FIG. 4 analyzes database activities to identify related columns. At step 705, the database super union column generation device 404 of FIG. 4 chooses suitable data type(s) for column transfer. At step 707, the database super union column generation device 404 of FIG. 4 restructures a super union column. The super union column may append many commonly queried values, especially with regard to related columns. At step 709, the database super union column generation device 404 of FIG. 4 updates the database catalog (the referenced database).

Figure 8:
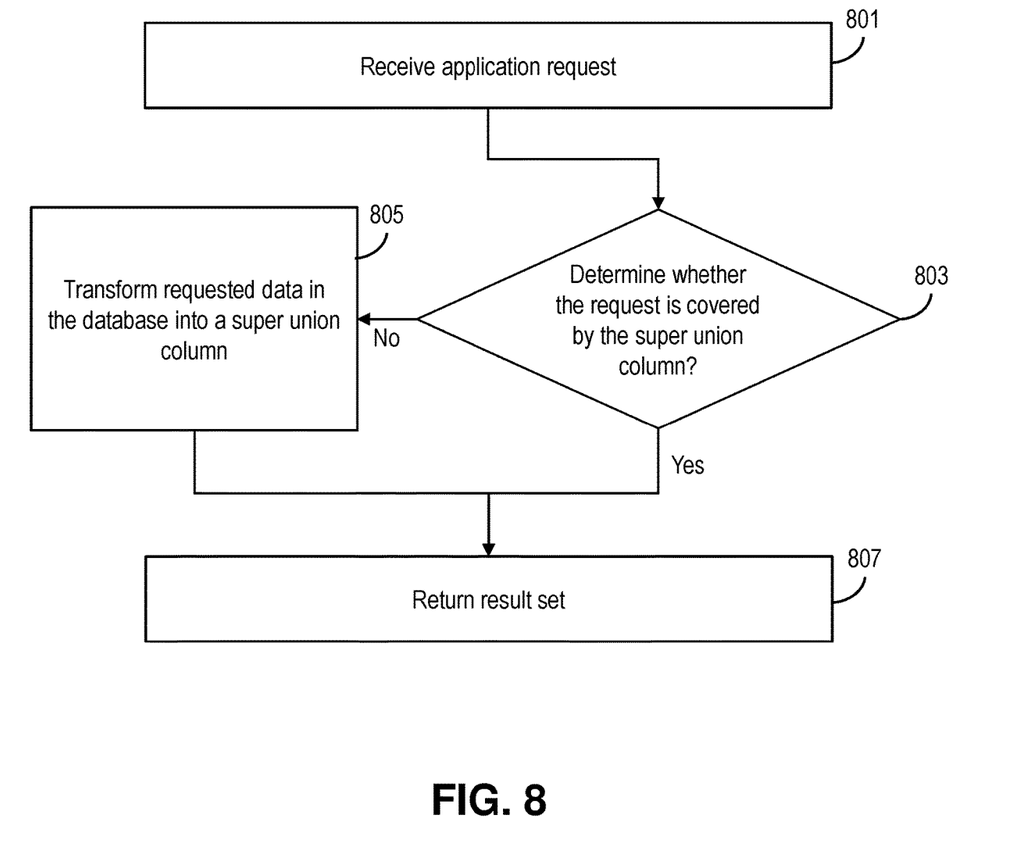
FIG. 8 shows a flowchart of another exemplary method of using a super union column in accordance with aspects of the invention.

FIG. 8 shows a flowchart of an exemplary method in accordance with aspects of the present invention. Steps of the method may be carried out in the environment of FIG. 4 and are described with reference to elements depicted in FIG. 4.

At step 801, the database super union column generation device 404 of FIG. 4 receives application request(s) or queries for information from a database. At step 803, the database super union column generation device 404 of FIG. 4 determines whether the request is covered by the super union column. If the request is not covered by the super union column, then at step 805 the database super union column generation device 404 of FIG. 4 transforms the requested data in the database into a super union column, e.g., in the manner described with respect to FIG. 7. If the request is covered by the super union column, then at step 807 the database super union column generation device 404 of FIG. 4 returns a result set based on data in the super union column.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   collecting, by a computing device, database activities and database structure information of a database;
   identifying, by the computing device, related columns in the database;
   determining, by the computing device, one or more data types for column transference of the identified related columns;
   generating, by the computing device, a super union column based on the column transference and the identified related columns; and
   updating, by the computing device, the database with the super union column,
   wherein the related columns in the database are identified by return information of a previous user request query of the database, and
   the column transference reduces a complexity of the one or more data types of the identified related columns by transferring the one or more data types of the identified related columns to a simple data type which reduces bits of stored memory for the one more data types of the identified related columns.

2. The computer-implemented method of claim 1, further comprising:
receiving a query from an application for data in the updated database;
determining the query is covered by data in the super union column; and
sending a result set to the application using the data in the super union column based on the determination that the query is covered by the data in the super union column.

3. The computer-implemented method of claim 1, wherein the database activities are collected from a database log.

4. The computer-implemented method of claim 2, further comprising:
normalizing the query.

5. The computer-implemented method of claim 4, wherein the normalizing the query comprises removing or replacing predicates, functions in where-conditions and sub-queries, or case-when structures from the query.

6. The computer-implemented method of claim 5, wherein the result set is based on the normalized query.

7. The computer-implemented method of claim 1, wherein the column transference reduces the bits used by the data in the super union column, and the simple data type is a simpler data type than the one or more data types.

8. The computer-implemented method of claim 7, wherein the super union column is generated by adding a case-when structure to the query.

9. The computer-implemented method of claim 2, wherein the result set includes a query build rule based on the query.

10. The computer-implemented method of claim 1, wherein the computing device includes software provided as a service in a cloud environment.

11. A computer program product comprising one or more computer readable storage media having program instructions collectively stored on the one or more computer readable storage media, the program instructions executable to:
collect database activities and database structure information of a database;
identify related columns in the database;
determine one or more data types for column transference of the identified related columns;
generate a super union column based on the column transference and the identified related columns; and
append the super union column to the database,
wherein the related columns in the database are identified by return information of a previous user request query of the database, and
the column transference reduces a complexity of the one or more data types of the identified related columns by transferring the one or more data types of the identified related columns to a simple data type which reduces bits of stored memory for the one more data types of the identified related columns.

12. The computer program product of claim 11, wherein the program instructions are further executable to:
receive a query from an application for data in the appended database;
determine the query is covered by data in the super union column; and
send a result set using the data from the super union column based on the determination that the query is covered by the data in the super union column to the application.

13. The computer program product of claim 12, wherein the result set includes a query build rule based on the query, and the simple data type is a simpler data type than the one or more data types.

14. A system comprising:
a processor, a computer readable memory, one or more computer readable storage media, and program instructions collectively stored on the one or more computer readable storage media, the program instructions executable to:
receive a query from an application for data in a database with a super union column;
identify related columns in the database;
determine one or more data types for column transference of the identified related columns;
determine the query is covered by data in the super union column; and
send a result set using the data in the super union column based on the determination that the query is covered by the data in the super union column to the application,
wherein the related columns in the database are identified by return information of a previous user request query of the database, and
the column transference reduces a complexity of the one or more data types of the identified related columns by transferring the one or more data types of the identified related columns to a simple data type which reduces bits of stored memory for the one more data types of the identified related columns.

15. The system of claim 14, wherein the program instructions are further executable to:
collect database activities and database structure information of a database;
generate another super union column based on the column transference and the identified related columns; and
update the database with the another super union column.

16. The system of claim 14, wherein the result set includes a super union column rule, and the simple data type is a simpler data type than the one or more data types.

17. The computer-implemented method of claim 1, wherein the super union column has a reduced storage requirement by utilizing the column transference of the identified related columns, and the column transference is included in the super union column for a fast call back.

18. The computer-implemented method of claim 17, further comprising:
tracking historical activity of the database for commonly called values and columns from the database; and
setting aside the commonly called values and columns in the super union column with a simplified data type.

19. The computer program product of claim 11, wherein the super union column has a reduced storage requirement by utilizing the column transference of the identified related columns, and the column transference is included in the super union column for a fast call back.

20. The system of claim 14, wherein the super union column has a reduced storage requirement by utilizing column transference of the identified related columns, and the column transference is included in the super union column for a fast call back.

* * * * *